United States Patent [19]

Schaidl et al.

[11] Patent Number: 5,049,054

[45] Date of Patent: Sep. 17, 1991

[54] PRESS HAVING A TOOL MOUNT TO BE INSERTED INTO THE PRESS

[75] Inventors: Hubert Schaidl, Bichl, Fed. Rep. of Germany; Hermann Good, Buchs, Switzerland; Roland Fleissner, Benediktbeuern, Fed. Rep. of Germany; Josef Schroferle, Sindelsdorf, Fed. Rep. of Germany; Dietmar Herren, Benediktbeuern, Fed. Rep. of Germany

[73] Assignee: Dorst-Maschinen- und Analagenbau, Otto Dorst und Dipl.-Ing. Walter Schlegel GmbH & Co., Fed. Rep. of Germany

[21] Appl. No.: 494,682

[22] Filed: Mar. 16, 1990

[30] Foreign Application Priority Data

Mar. 23, 1989 [DE] Fed. Rep. of Germany ....... 3909757

[51] Int. Cl.[5] ........................ B29C 43/14; B30B 15/02

[52] U.S. Cl. ...................................... 425/78; 425/356; 425/444; 425/422

[58] Field of Search ................. 425/78, 344, 352, 444, 425/356, 406, 422

[56] References Cited

U.S. PATENT DOCUMENTS

| | | | |
|---|---|---|---|
| 3,353,215 | 11/1967 | Haller | 425/78 |
| 3,593,366 | 7/1971 | Smith | 425/78 |
| 3,635,617 | 1/1972 | Hara et al. | 425/450 |
| 3,664,784 | 5/1972 | Sibley | 425/78 |
| 3,868,201 | 2/1975 | Jacobson et al. | 425/78 |
| 4,153,399 | 5/1979 | DeSantis | 425/344 |
| 4,370,119 | 1/1983 | Watanabe | 425/78 |
| 4,392,800 | 7/1983 | Apuzzo | 425/78 |
| 4,419,413 | 12/1983 | Ebihara | 425/78 |
| 4,482,307 | 11/1984 | Schaidl et al. | 425/352 |

FOREIGN PATENT DOCUMENTS

| | | | |
|---|---|---|---|
| 3142126 | 5/1983 | Fed. Rep. of Germany . | |
| 1041209 | 9/1983 | U.S.S.R. | 425/78 |
| 1092005 | 5/1984 | U.S.S.R. | 425/78 |

*Primary Examiner*—Jay H. Woo
*Assistant Examiner*—Khanh P. Nguyen
*Attorney, Agent, or Firm*—Reese Taylor

[57] ABSTRACT

In a press having an upper punch and lower punch and a tool mount to be inserted into the press and connected to the lower punch via a lower coupling plate and to the upper punch via an upper joining piece, and a framework mounted displaceably on a base plate of the mount and consisting of connecting rods rigidly connecting the lower coupling plate with the matrix holding plate, die carriers being moved relative to the base plate from their filling position downward into the compacting position and from the compacting position into the ejecting position, which corresponds to the filling position (the so-called ejection method), at lease one additional die carrier, like the matrix holding plate, works by the withdrawal method, this die carrier being moved from the filling position downward into the compacting position and from the compacting position downward into the withdrawing position.

15 Claims, 7 Drawing Sheets

PRESS HAVING A TOOL MOUNT TO BE INSERTED INTO THE PRESS

BACKGROUND OF THE INVENTION

The present invention relates to a press having an upper punch and a lower punch and a tool mount to be inserted into the press and connected to the lower punch via a lower coupling plate and to the upper punch via an upper joining piece, and a framework mounted displacedly on a base plate of the mount and die carriers being moved relatively of the base plate. The invention relates in particular to a press for making compacts from powdered material, having an upper punch and lower punch and a multiplate system designed as an adapter unit to be fit into and dismantled from the press in a tool mount.

DESCRIPTION OF THE PRIOR ART

Such a press having a multiplate adapter is already known (German Patent No. 31 42 126). In this press, three die carrier plates are movable from a base plate fixed with respect to the press via hydraulic piston-cylinder units which all work by the ejection method, i.e., are moved from the filling position downward into the compacting position and from the compacting position upward into the ejecting position. This mode of operation makes it necessary for all piston-cylinder units to be concentrated within the tool mount, substantially in the base plate, as drive systems for the die carrier plates working by the ejection method. All piston-cylinder units associated with the die carrier plates must also be designed in accordance with the necessary ejection force necessary for withdrawing the compact from the mold after the matrix holding plate has been lowered into its withdrawal position, without it being possible to utilize the force introduced via the upper punch or lower punch, i.e., the force applied by the press itself.

In presses working by the withdrawal method, in which die carrier plates are moved into the withdrawing position at the same time as the matrix holding plate, the path to be covered by both the matrix holding plate and the die carrier plates from the filling position to the compacting position and further down into the withdrawing position is relatively long, which results in press parts with relatively high daylight. In addition, a complicated mechanism is required for laterally moving away slide means supporting the die carrier plates with respect to the press frame in the compacting position to make room for the downward motion of the die carrier plates into the withdrawing position. This also involves corresponding control efforts.

SUMMARY OF THE INVENTION

The invention is based on the problem of providing a press having a very compact tool mount to be inserted into the press as an adapter unit for producing stepped compacts from powdered material, said mount being resettable without great effort for making different stepped compacts.

This problem is solved according to the invention by providing at least one additional die carrier which, like the matrix holding plate, works by the withdrawal method and is moved from the filling position downward into the compacting position and from the compacting position downward into the withdrawing position.

According to the invention, a tool mount designed as an adapter unit is provided which is constructed in such a way as to integrate both die carrier plates working by the ejection method and die carrier plates working by the withdrawal method. This makes it possible to produce a wide variety of stepped compacts having very different shapes, the particular advantage being that the tool mount can be kept extremely compact in terms of its width and its daylight. Such a construction allows for a reduction of the piston-cylinder units required for moving the die carrier plates into the ejecting position, which must otherwise be concentrated within the tool mount, in particular on the base plate.

The die carrier plate working by the withdrawal method, i.e., the withdrawal plate, is expediently designed in such a way that at least one of the ejection plates is disposed optionally above or below the withdrawal plate. In this connection, it is expedient to provide the withdrawal plate with openings for the moving pistons of at least one ejection plate to pass through.

The motion of the withdrawal plate from the compacting position into the withdrawing position is expediently coupled with the motion of the lower punch by virtue of adjustable stops on the matrix plate that come against the withdrawal plate. It is expedient for slides to be moved away laterally via corresponding stops at the same time as the downward motion of the matrix holding plate, thereby creating a space therebelow for the downward motion of the withdrawal plate into the withdrawing position. It is also expedient to couple the withdrawal plate with the motion of the upper punch via connecting rods to move the withdrawal plate out of the fillling position into the compacting position. These connecting rods are expediently of adjustable design.

In order to prevent parts of the press being damaged by the upper punch of the press moving further downward after the withdrawal plate has reached the compacting position, the connecting rods act on stops on the withdrawal plate which are supported with respect to the withdrawal plate via pressure medium cushions which are adjustable by means of a discharge valve that lets off pressure medium.

By interposing spacers, it is possible to shift one of the ejection method die carrier plates upward, i.e., disposed it above the withdrawakl plate. Without these spacers, this die carrier plate is disposed below the withdrawal plate. These spacers reach through corresponding openings in the withdrawal plate. This makes it possible to produce a wide variety of differently stepped compacts while ensuring fast resetting.

BRIEF DESCRIPTION OF THE PREFERRED EMBODIMENTS

Figure 1:
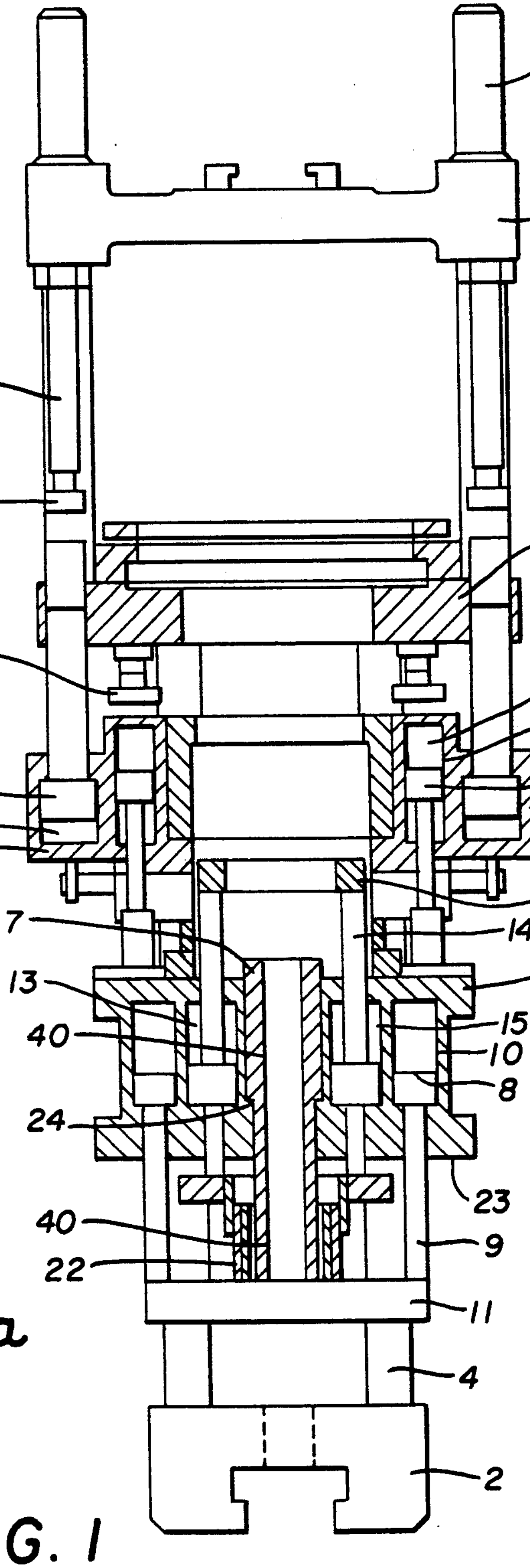
FIG. 1 shows a schematic view, partially in cross-section, of a tool mount wherein the ejection method die carrier plates are disposed below the withdrawal plate.

The embodiment explained with reference to FIGS. 1 to 3 comprises a base plate referred to as 1, which is stationary and firmly connected with the press after installation of the tool mount. In this base plate 1, a framework is guided displaceably which is constructed of a lower coupling plate 2 and a matrix holding plate 3 which are rigidly interconnected via connecting rods 4. The displaceable guidance of the framework in base plate 1 is effected via connecting rods 4.

Lower coupling plate 2 is coupled or connected with the lower punch of the press. The connection of the tool frame to the upper punch of the press is effected via an upper joining piece 5. In the embodiment shown, this joining piece 5 is displaceable on guide rods 6 which are firmly connected with matrix holding plate 3. In an alternative embodiment, guide rods 7 may be displaceable relative to matrix holding plate 3, whereby upper joining piece 5 is firmly connected with guide rods 6.

Starting from base plate 1, a die carrier 7 is movable which works by the ejection method, i.e., is lowerable from the filling position into a compacting position and movable from the compacting position into an ejecting position which corresponds to the filling position. The motion of die carrier 7 relative to base plate 1 is effected via two piston-cylinder units 8, which are preferably operated hydraulically, but may also be operated pneumatically like the piston-cylinder units described below. Pistons 9 of the piston-cylinder units are guided in cylinders 10 of base plate 1 and act on a plate 11 which is part of die carrier 7.

Starting from base plate 1, another die carrier 12 is movable by two piston cylinder units 13, the pistons referred to as 14 being guided in cylinders 15 which are formed in base plate 1. Die carrier 12, also referred to below as a bridge, works by the ejection methods, as does die carrier 7. For the sake of simplicity, die carriers 7 and 12 will thus be referred to below as ejection plates.

Figure 2:
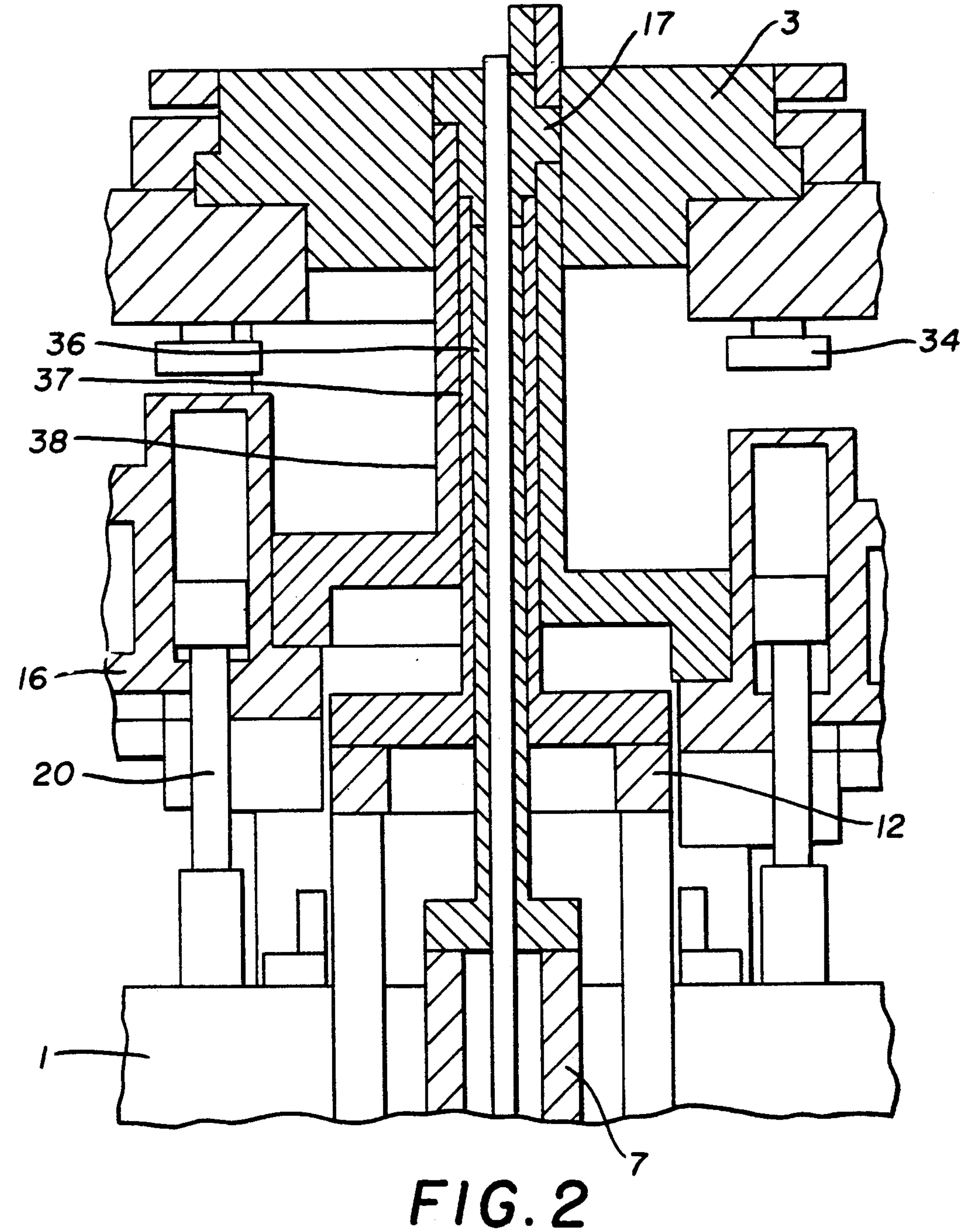
FIGS. 2 and 3 show schematic views to illustrate the functional principle of the press.
Figure 3:
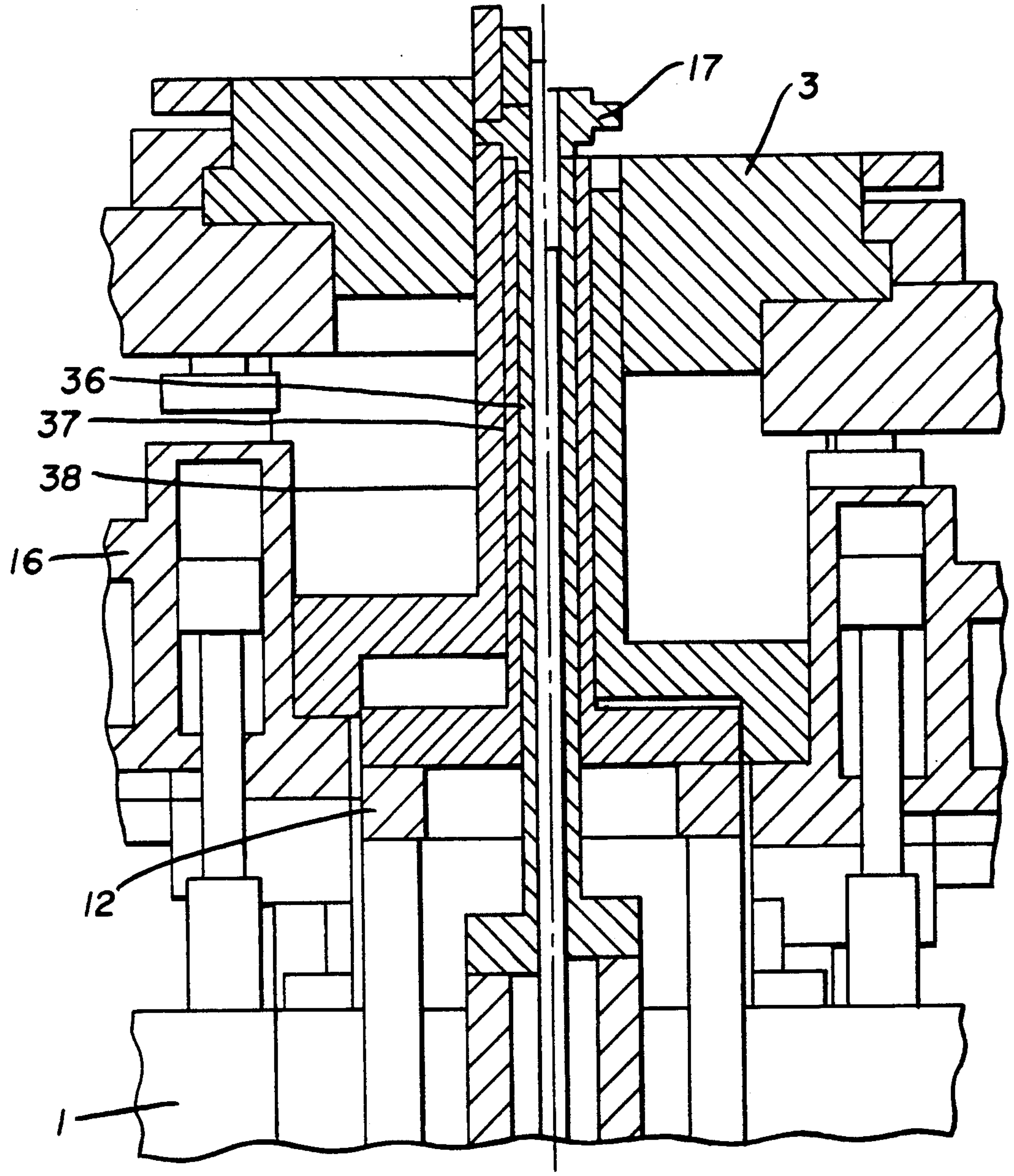

By contrast, the third die carrier 16 works by the withdrawal method as does matrix holding plate 3 which, since it is coupled with lower coupling plate 2 via connecting rod 4, is raised by the lower punch of the press (not shown) into the filling position, moved downward in controlled fashion from the filling position during the compacting operatiion and, after the upper die is lifted off the compact, moved further downward by the lower punch until the compact referred to as 17 in FIGS. 2 and 3 is released. The withdrawing position is shown on the right in FIG. 3.

Die carrier 16, also referred to below as withdrawal plate 16, is displaceable relative to base plate 1, although, in the embodiment shown, cylinders 18 of the two piston-cylinder units 19 are formed in withdrawal plate 16 itself. The lower ends of pistons 20 are connected to base plate 1. However, a kinematic reversal is also possible, so that, corresponding pistons 20 are mounted in corresponding cylinders of base plate 1, in which case the upper ends of pistons 20 are firmly connected with die carrier or withdrawal plate 16.

A further die carrier 21 that is stationary with base plate 1 (compare the embodiment of FIG. 4) is seated on base plate 1.

The filling position of ejection method die carrier 7 is limited by nuts 22 which are disposed on plate 11 and comes against underside 23 of base plate 1. Nuts 22 are adjustable relative to each other to make the stop adjustable. The compacting position of ejection plate 7 is defined by a shoulder 4 lying against an inside bore of base plate 1.

Figure 1A:
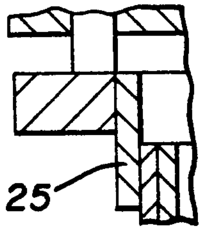
FIG. 1*a* is an enlarged schematic view taken from FIG. 1 showing an adjustable stop for the ejection method die carrier.
Figure 4A:
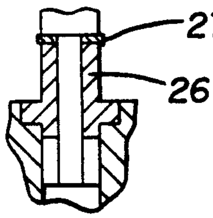
FIG. 4*a* is an enlarged schematic view taken from FIG. 4 showing the stop apparatus for engaging the lower ends of the pistons of the withdrawal plate.

The filling position of ejection plate 12 is defined by an adjustable stop ring 25 which comes against underside 23 of base plate 1 in the filling position and is shown in the detailed view of FIG. 1*a*. The compacting position of withdrawal plate 12 is indicated by the alternative embodiment of FIG. 4, namely in the detailed view of FIG. 4*a*, according to which a corresponding stop 26 with a grind-in plate 27 is disposed on base plate 1 to stop the lower ends of the pistons of withdrawal plate 12.

Figure 4:
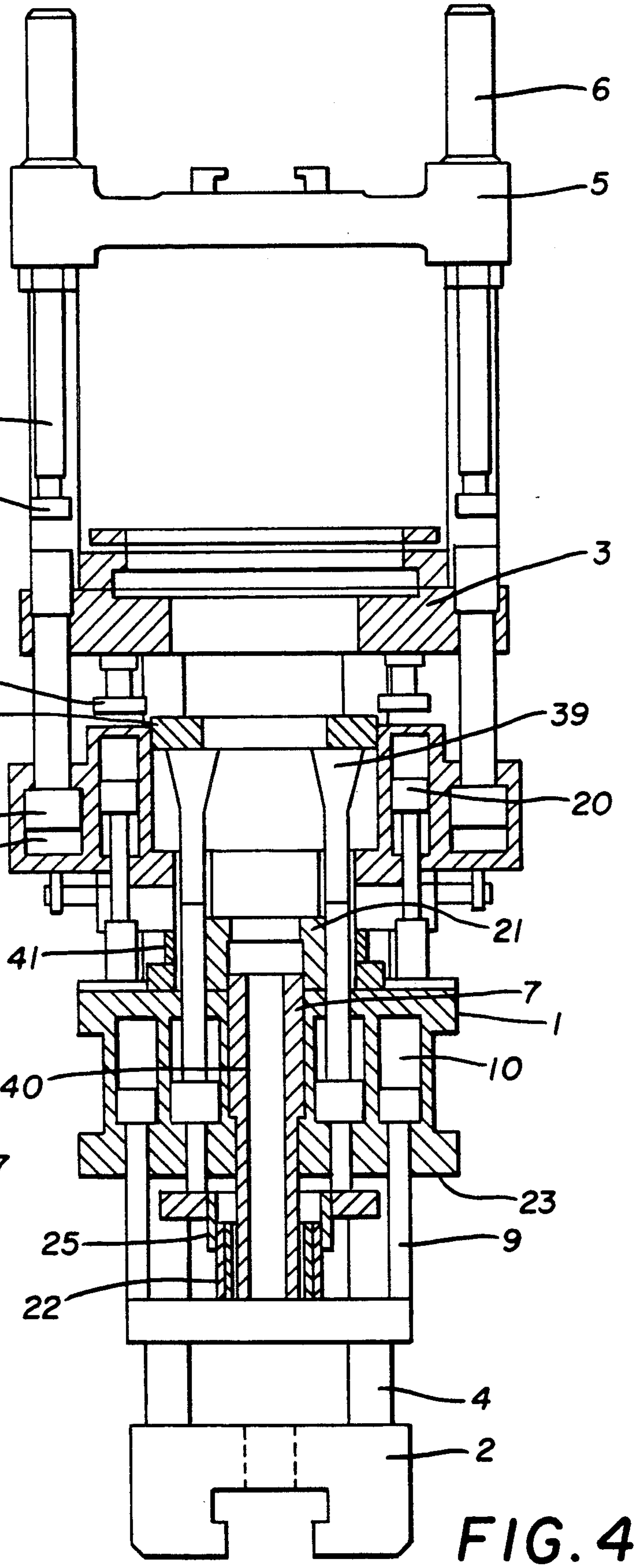
FIG. 4 shows an embodiment wherein an ejection method die carrier plate is disposed above the withdrawal plate.

The filling position of withdrawal plate 16 is defined by stops on withdrawal plate 16, which are not visible in FIG. 1, wherein a threaded rod to be screwed up with respect to base plate 1 is provided for the purpose of adjustment, defining with a head as a stop shoulder the motion of withdrawal plate 16 and thus the filling position. In the compacting position, withdrawal plate 16 is pressed over the powder pillar and is supported here too with respect to base plate 1 via a stop 41, as indicated by FIG. 4 and also by FIG. 1*b*. Alternatively, withdrawal plate 16 can also be moved from its filling position into the compacting position by virtue of adjustable stops 28 mounted on upper joint piece 5 via rods 29 acting on, in particular pressing, rods 30 which are connected with withdrawal plate 16 via a pressure medium cushion 31.

Since the motion of withdrawal plate 16 from the filling position into the compacting position is coupled with the motion of upper joining piece 5 via the upper punch of the press, pressure medium can be let out of cylinder 32 for pressure medium cushion 31 via a discharge valve (not shown) when withdrawal plate 12 has already reached its compacting position before the upper punch reaches the compacting position. Otherwise, the downward motion of the upper punch would be hindered by pressure medium cushion 31, which can result in destruction of press parts.

The motion of matrix holding plate 3 into the filling position is performed via the motion of the lower punch due to the coupling of the framework with lower coupling part 2. During the compacting operation, matrix holding plate 3 is brought downward in controlled fashion, again due to the coupling with the lower punch via the framework, matrix holding plate 3 being supported in the compacting position in the press, namely via the lower punch.

Figure 1B:
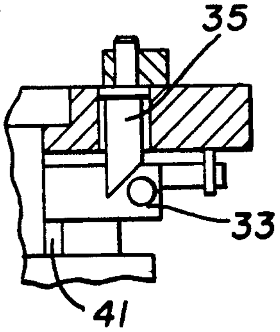
FIG. 1*b* is an enlarged schematic view taken from FIG. 1 showing the apparatus for moving slides laterally to provide an opening for movement of the withdrawal plate.

During the withdrawal motion of matrix holding plate 3, two slides are laterally moved away toward the outside, the right-hand slide being shown in the detailed view of FIG. 1*b* and characterized by reference number 33. This lateral outward motion of slides 33 is obtained by virtue of adjustable stops 34 disposed on matrix holding plate 3 pressing on a movable wedge 35 mounted in withdrawal plate 16, when matrix holding plate 3 is being shifted into the withdrawing position, said wedge pressing slides 33 laterally outward so that the path downward is free for withdrawal plate 16, which is brought into the withdrawing position in conjunction with the downward motion of matrix holding plate 3. As soon as the path for withdrawal plate 16 is free due to slides 33 being moved away, withdrawal plate 16 is brought into the withdrawing position with the further downward motion of matrix holding plate 3 via stops 34.

FIGS. 2 and 3 show the motion of the individual dies from the filling position into the compacting position and from the compacting position into the ejecting position or the withdrawing position of the matrix holding plate. Die 36 is supported on ejection plate 7, die 37 on ejection plate 12 and die 38 on withdrawal plate 16. FIGS. 2 and 3, like FIGS. 5 and 6, indicate upper dies for shaping the upper surface of compacts 17 which are mounted on the upper joining piece but need not be described here in any detail.

As indicated by a comparison of the left and right in FIG. 3, matrix holding plate 3 is brought downward into the withdrawing position after the compacting of compact 17 until matrix holding plate 3 releases compact 17. At the same time, die 38 on withdrawal plate 16 is brought into the withdrawing position with matrix holding plate 3, whereafter dies 36 and 37 are moved into the ejecting position to release compact 17, as apparent on the right in FIG. 3.

Figure 5:
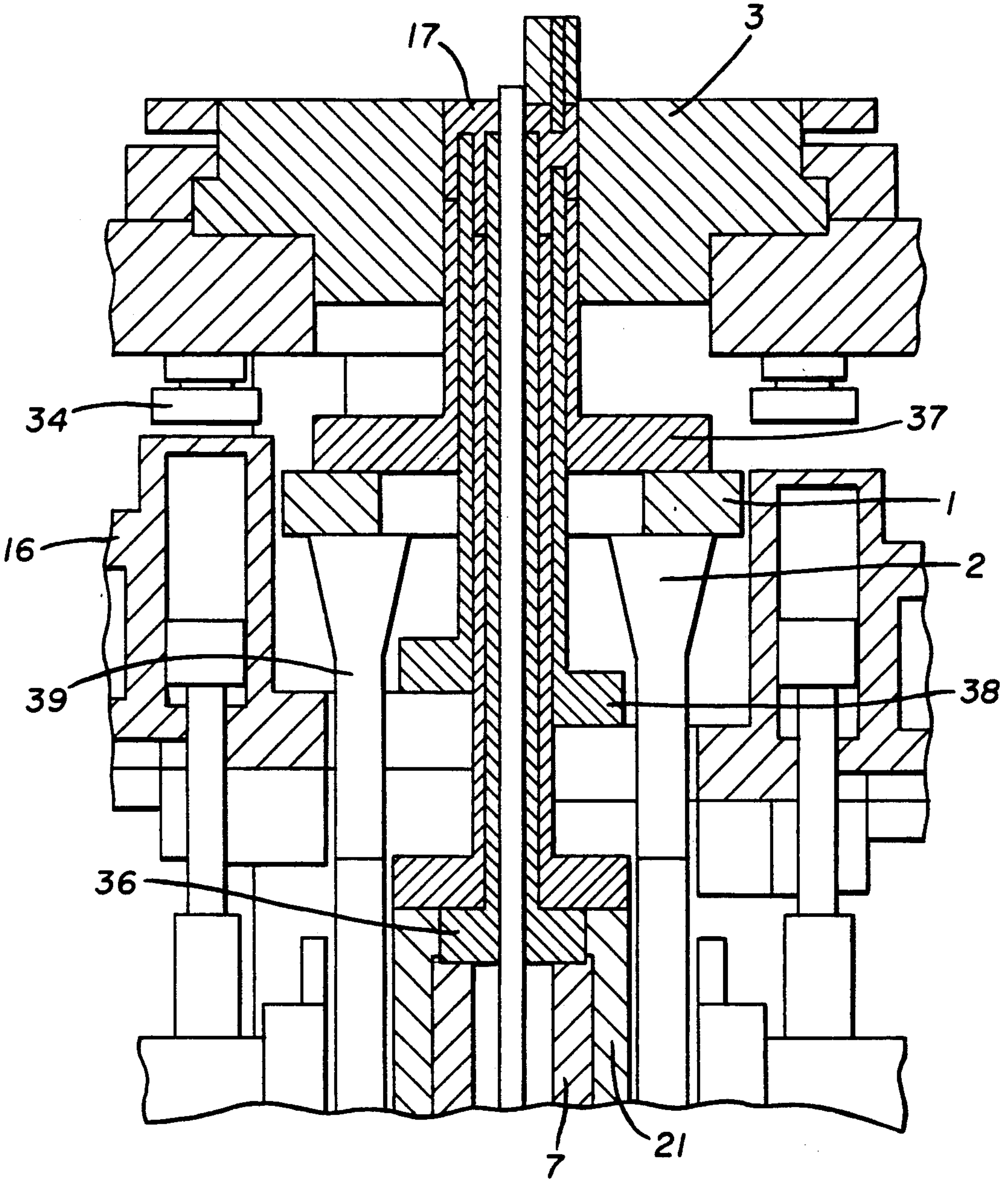
FIGS. 5 and 6 show schematic views to illustrate the functional principle of the press.
Figure 6:
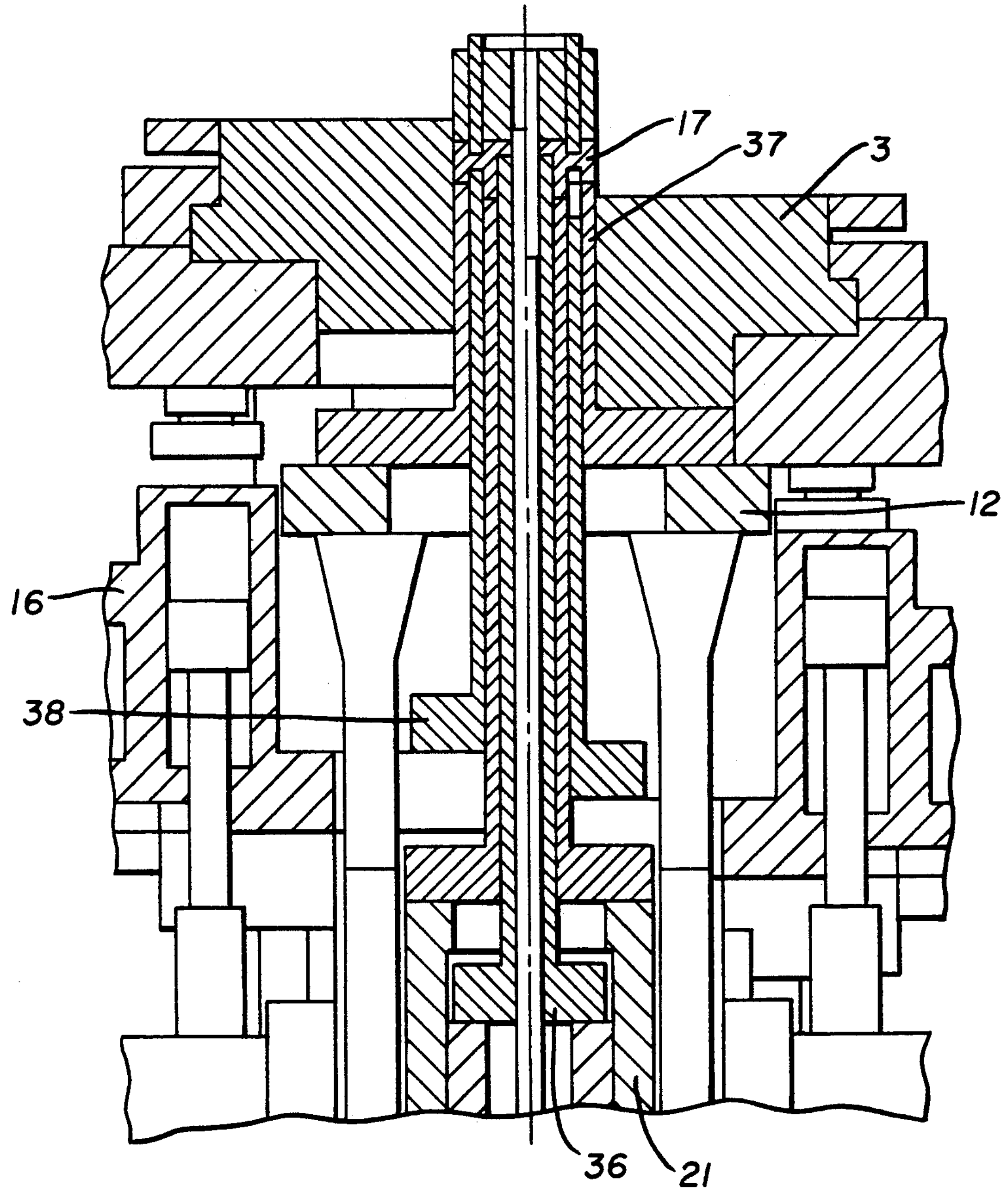
Figure 7A:
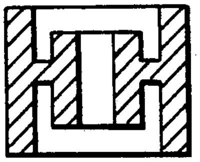
FIGS. 7*a*–7*e* show various stepped compacts that can be produced by the press of FIGS. 4–6.
Figure 7B:
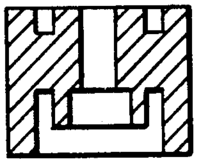
Figure 7C:
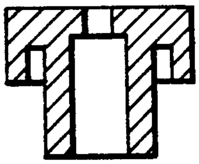
Figure 7D:
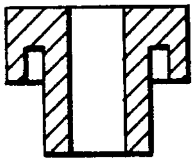
Figure 7E:
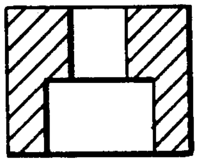
Figure 7F:
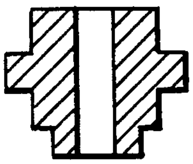
FIGS. 7*f* and 7*g* show various stepped compacts that can be produced by the press of FIGS. 1–3.
Figure 7G:
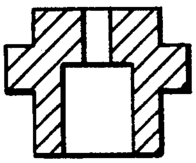

The described embodiment as in FIGS. 1 to 3 can be used to produce stepped compacts having the shape shown in FIG. 7*b*. Should stepped compacts of powdered material be produced with the contours shown in FIG. 7*a*, however, this is done with a press or a tool mount as in the embodiment of FIGS. 4 to 6. For this purpose, one need only reset the tool mount in such a way that ejection plate 12 taking up die 37 is disposed above withdrawal plate 16. This is done, according to the embodiment of FIG. 4, by interposing spacers or distance rods 39 which are screwed to the upper ends of pistons 14 of piston-cylinder units 13. Spacers 19 or pistons 14 of ejection plate 12 are guided by corresponding bores in withdrawal plate 16. In this embodiment, withdrawal plate 16 is thus located below ejection plate 12 so that it can be moved downward into the withdrawing position without being hindered by ejection plate 12. In the embodiment of FIGS. 4 to 6, the same reference numbers are used for the same parts as in the embodiment of FIGS. 1 to 3.

What is claimed is:

1. A press for producing multistepped compacts and including an upper and lower punch and a tool mount connected to the ower punch via a lower coupling plate and to the upper punch via an upper joining piece, and a framework mounted displaceably on a base plate of the mount and consisting of connection rods connecting the lower coupling plate with a matrix holding plate, comprising:

a) first and second die carrries (7,12) movable from a filling position spaced from the base plate downward toward the base plate into a compacting position and then upward, away from the base plate into an ejecting position; and b) at least a third die carrier (16) movable with the upper punch downwardly toward the base from a filling position to a compacting position and then further downwardly to a withdrawal position as said first and second die carriers move upwardly to an ejecting position.

2. The press of claim 1 wherein said third die carrier (16) is mounted so that at least one of said first and second die carries are disposed in a vertically offset positon with respect to said third die carrier.

3. The press of claim 1 or 2 wherein pistons (14) are mounted in said press for engagement with and movement of said second die carrie (12); and said third die carrier has openings for said pistons (14) to pass through.

4. The press of claim 1 or 2 wherein the matrix holding plate is attached to the upper punch; and adjustable stops (34) are mounted on the matrix holding plate (3) and bear against said third die carrier as it is moved from the compacting position to the withdrawal position.

5. The press of claim 4 wherein said third die carrier is supported with respect to the base plate (1) in the compacting position via a stop (41) disposed on the base plate and laterally movable slides (33); said laterally movable slides (33) being laterally movable by engagement with said stops (34) on said matrix holding plate (3) as said third die carrier is moved from the compacting position to the withdrawal position, thereby unblocking the path of said third die carrier (16) into the withdrawal position.

6. The press of claim 5 wherein said stop (41) that is supported with respect to the base plate (1) is adjustable.

7. The press of claim 1 wherein said third die carrier (16) is movable together with the upper punch from the filling position into the compacting position along connecting rods (28,29).

8. The press of claim 7 wherein the connecting rods (28,29) are adjustable and disposed on the upper joining piece (5) of the tool mount.

9. The press of claim 7 or 8 wherein stops (30) are disposed on said third die carrier (16); a pressure medium cushion (31) is disposed on said stops; and said connection rods (28,29) engage said pressure medium cushion.

10. The press of claim 9 wherein cylinders (32) support said pressure medium cushion (31); and said cylinders have a pressure discharge valve for protecting the press parts in case of further motion of the upper punch after said third die carrier (16) has reached the compacting position.

11. The press of claim 1 or 10 wherein a fourth die carrier (21) is firmly disposed on the base plate (1).

12. The press of claim 1 wherein said first die carrier (7) carries an ejection piston having a bore (40) for a further die to pass through.

13. The press of claim 1 wherein movement of said first and second die carriers (7,12) is limited in the filling position with respect to the base plate (1) by adjustable stop rings (22,25).

14. The press of claim 1 wherein movement of said third die carrier (16) is limited in the filling position by adjustable stops.

15. The press of claim 1 wherein spacers (39) are disposed beneath said second die carrer (12) and above said third die carrier (16); and said spacer (39) and said second die carrier (12), if it is disposed below the withdrawal plate (16), are seated in the compacting position on grind-in plates (27) carried on the base plate (1).

* * * * *

UNITED STATES PATENT AND TRADEMARK OFFICE
CERTIFICATE OF CORRECTION

PATENT NO. : 5,049,054 Page 1 of 2

DATED : September 17, 1991

INVENTOR(S) : Hubert Schaidl et al.

It is certified that error appears in the above-identified patent and that said Letters Patent is hereby corrected as shown below:

On page 1 of the patent, under the heading "Assignee," delete "Analagenbau" and substitute therefor --Anlagenbau--.

Column 2, line 45, delete "disposed" and substitute therefor --dispose--.

Column 2, line 46, delete "withdrawakl" and substitute therefor --withdrawal--.

Column 3, line 57, delete "operatiion" and substitute therefor --operation--.

Column 4, line 26, delete "wherein" and substitute therefor --whereby--.

Column 5, line 53, delete "ower" and substitute therefor --lower--.

Column 5, line 58, delete "carrries" and substitute therefor --carriers--.

Column 6, line 5, delete "carries" and substitute therefor --carriers--.

Column 6, line 9, delete "carrie" and substitute therefor --carrier--.

UNITED STATES PATENT AND TRADEMARK OFFICE
CERTIFICATE OF CORRECTION

PATENT NO. : 5,049,054

DATED : September 17, 1991

INVENTOR(S) : Hubert Schaidl, et al.

It is certified that error appears in the above-identified patent and that said Letters Patent is hereby corrected as shown below:

Column 6, line 41, delete "connection" and substitute therefor --connecting--.

Column 6, line 62, delete "carrer" and substitute therefor --carrier--.

Signed and Sealed this

Ninth Day of February, 1993

*Attest:*

STEPHEN G. KUNIN

*Attesting Officer* *Acting Commissioner of Patents and Trademarks*